(12) United States Patent
Kapadia et al.

(10) Patent No.: US 7,801,880 B2
(45) Date of Patent: Sep. 21, 2010

(54) CRAWLING DATABASES FOR INFORMATION

(75) Inventors: Arshish C Kapadia, Issaquah, WA (US); Jonah Burke, Seattle, WA (US); R Daniel Parke, Jamacia Plain, MA (US); Howard M Crow, III, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 263 days.

(21) Appl. No.: 11/096,429

(22) Filed: Mar. 29, 2005

(65) Prior Publication Data

US 2006/0224592 A1     Oct. 5, 2006

(51) Int. Cl.
*G06F 7/00*        (2006.01)
(52) U.S. Cl. ..................................... 707/709; 707/706
(58) Field of Classification Search ....................... None
See application file for complete search history.

(56) References Cited

U.S. PATENT DOCUMENTS

| | | | | |
|---|---|---|---|---|
| 6,636,854 | B2 * | 10/2003 | Dutta et al. | 707/10 |
| 6,763,362 | B2 * | 7/2004 | McKeeth | 707/3 |
| 7,370,004 | B1 * | 5/2008 | Patel et al. | 705/14 |
| 2002/0042789 | A1 * | 4/2002 | Michalewicz et al. | 707/3 |
| 2002/0103794 | A1 * | 8/2002 | Chang | 707/3 |
| 2004/0044962 | A1 * | 3/2004 | Green et al. | 707/E17.108 |
| 2004/0117376 | A1 * | 6/2004 | Lavin et al. | 707/3 |
| 2004/0230572 | A1 * | 11/2004 | Omoigui | 707/3 |
| 2005/0240557 | A1 * | 10/2005 | Rorex et al. | 707/1 |
| 2005/0289123 | A1 * | 12/2005 | Dettinger et al. | 707/3 |

OTHER PUBLICATIONS

Bertino, E., et al., "Integration of Heterogeneous Database Applications Through an Object-Oriented Interface," *Information Systems* 14(5): 407-420, 1989.

"JDBC Guide: Getting Started" Mar. 6, 1997, Sun Microsystems, Inc., <http://docsrv.sco.com/JDK_guide/jdbc/getstart/introTOC.doc.html> [retrieved Jun. 25, 1998].

Liu, L., et al., "An Adaptive Approach to Query Mediation Across Heterogeneous Information Sources," *Proceedings of the First Int. Conference on Cooperative Information Systems,* Int. Foundation on Cooperative Information Systems, Brussels, Belgium, Jun. 19, 1996, pp. 144-156.

Ran, S., et al., "The Rigorous Evaluation of Enterprise Java Bean Technology," *Proceedings of the 15th Int. Conference on Information Networking,* Institute of Electrical and Electronics Engineers, Inc. (IEEE) Computer Society, Piscataway, New Jersey, Jan. 31-Feb. 2, 2001, pp. 93-100.

Chinese Office Action dated Oct. 17, 2008 cited in Application No. 200610051555.4.

* cited by examiner

*Primary Examiner*—Debbie Le
*Assistant Examiner*—Jau-Shya Meng
(74) *Attorney, Agent, or Firm*—Merchant & Gould

(57) ABSTRACT

A system facilitates the search engine to search for pieces of information in various databases and application documents without the need to know the specific protocols to communicate with the various databases and application documents, such as Microsoft Excel documents. Despite the multitude of possible protocols which a crawler would have to use to connect to the databases, the system includes a unifying application programming interface to unify the way to access pieces of information in the databases and application documents.

15 Claims, 10 Drawing Sheets

CRAWLING DATABASES FOR INFORMATION

FIELD OF THE INVENTION

The present invention relates generally to searching, and more particularly to crawling diverse sources of information, such as application documents and databases, so as to enhance keyword matches by search engines.

BACKGROUND OF THE INVENTION

The Internet 104 is a world-wide collection of networks and gateways that use the TCP/IP suite of protocols to communicate with one another. At the heart of the Internet 104 is the backbone of high-speed data communication lines between major nodes or host computers, consisting of thousands of commercial, government, educational, and other computer systems, that route data and messages. One or more Internet 104 nodes can go offline without endangering the Internet 104 as a whole or causing communications on the Internet 104 to stop, because no single computer or network controls it. The genesis of the Internet 104 was a decentralized network called ARPANET created by the Department of Defense in 1969 to facilitate communications in the event of a nuclear attack. Currently, the Internet 104 offers a range of services to users, such as e-mail and the World Wide Web.

Vast sets of interlinked hypertext documents 106 are residing on HTTP servers all around the world. These documents comprising the World Wide Web, called Web pages, are written in HTML (hypertext markup language), identified by URLs (uniform resource locators) that specify the particular machine and path name by which a file can be accessed, and transmitted from server to end user via HTTP (hypertext transfer protocol). These Web pages can be searched by a search engine 102 that gathers lists of available Web pages and stores these lists in databases that users can search by keywords. Older examples of search engines include Lycos and Excite. More recent examples of search engines include Google and A9.

Web pages are easy to search on the Internet 104 because many of them are written using a common language, HTML, accessible by agreed upon designation URLs, and communicable via a common protocol, HTTP. Searching on an intranet 108 poses problems typically not seen on the Internet 104. The intranet 108 is a private network based on Internet protocols, such as TCP/IP, but designed for information management within a company or organization. Its uses include such services as document distribution, software distribution, access to databases, and training. The intranet 108 is so called because it looks like a World Wide Web site and is based on similar technologies, yet is strictly internal to the organization and is not connected to the Internet proper. Web pages made available within the intranet 108 can be searched by a conventional search engine 102. As is typical, many documents, such as documents 112, connected to the intranet 108, are not formed using a common language, such as hypertext, but in more specific formats, such as Microsoft Word, Microsoft Excel, and so on. Conventional search engines, such as the search engine 102, are unable to search for pieces of information within documents 112 that are not formed from a common language, such as hypertext.

A similar problem occurs when searching databases, such as a database 110. In a database, data is not associated with a document, such as a Web page. But there are desired pieces of information stored within the database 110 that need to be exposed to users of the intranet 108. Unfortunately, the database 110 lacks any well organized structure to search. Another problem with searching the database 110 is that there are many protocols that can be used to search the database 110. For example, the search engine 102 can use a query language to access the data. As is typical, however, databases, such as the database 110, are not accessed directly, but instead the search engine 102 has to go through various sets of application programming interfaces. Unlike the Internet 104, where the search engine 102 has to know only one protocol, which is HTTP, to communicate with Web pages to extract data, searching the intranet 108 may require the search engine 102 to know multiple protocols that may or may not be appropriate to extract pieces of information from databases, such as the database 110, or application documents 112.

While these problems and others are discussed above in the context of intranet searches, other database searches and document searches have similar, if not identical, problems in heterogeneous environments that are often associated with an intranet. Without resolution to the problem of responding efficiently to users' intranet queries, users may eventually no longer trust a search engine 102 to provide a desired computing experience that can reproduce stored pieces of information, and demand for search engines will diminish in the marketplace. Thus, there is a need for a system, method, and tangible computer-readable medium for responding to intranet queries while avoiding or reducing the foregoing and other problems associated with existing systems.

SUMMARY OF THE INVENTION

In accordance with this invention, a system, method, and tangible computer-readable medium for crawling databases and application documents is provided. The system form of the invention comprises a system for exploring diverse databases for information. The system includes unifying data structures stored in a tangible computer-readable medium for enumerating a set of databases to be explored and filters for constraining the information to be returned. The system further includes a unifying application programming interface stored in another tangible computer-readable medium for transforming protocols for communicating with the set of databases into one protocol. The system further includes a crawler using the one protocol to invoke a method described in the unifying data structures to explore desired pieces of information in the set of databases without knowing the protocol specific to each database in the set of databases.

In accordance with further aspects of this invention, a computer-readable medium form of the invention includes a computer-readable medium having a data structure stored thereon for enhancing a process for crawling for pieces of information in diverse databases. In embodiments consistent with the invention, the computer-readable medium, for example, comprises a physical material used for storing computer based information to be interpreted and acted upon by a computer. The computer-readable medium, in embodiments consistent with the invention, are suitable, for example, to be fed directly into the computer for processing the data structure stored thereon. The data structure includes a system field that is indicative of a database to be explored by a crawler, an entity field that is indicative of a meaning to be imparted to pieces of information stored in the database, a method that is indicative of an invokable piece of logic for finding instances of the entity field in the database, a parameter field that is indicative of a variable to be populated by a value, and a filter field that is indicative of an annotation to constrain the pieces of information to be returned via the invocation of the method.

In accordance with further aspects of this invention, a method form of the invention includes a computer-implemented method for exploring databases and application documents for desired pieces of information. The method includes crawling for desired pieces of information by accessing unifying data structures to explore each entity under each database by invoking a finder method with one or more filters. Each filter constrains the pieces of information to be returned. The method further includes receiving a selection when a user selects a hyperlink. The hyperlink is associated with an identifier to obtain pieces of information in one or more databases pertaining to an entity associated with the identifier.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
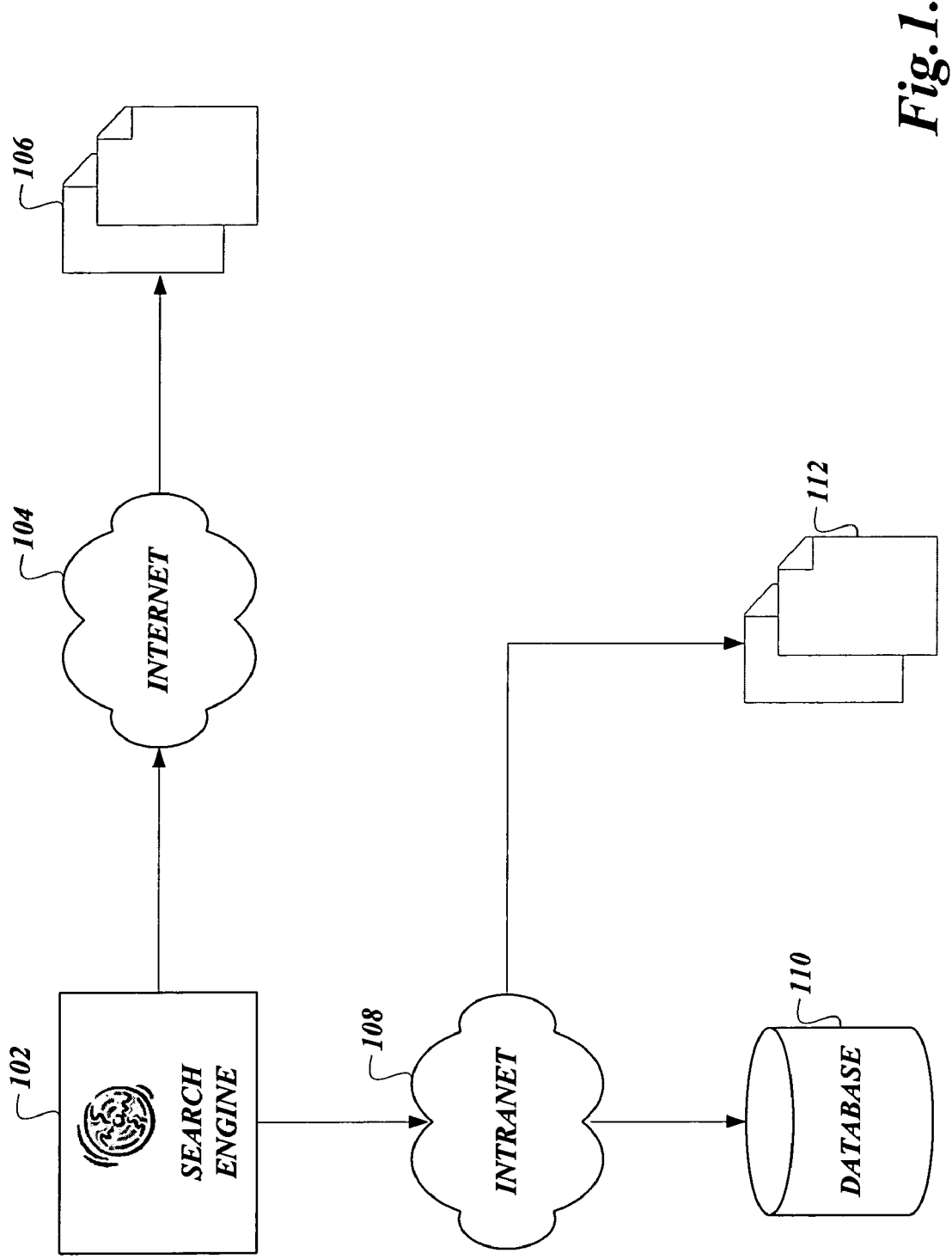
FIG. 1 is a block diagram illustrating a conventional system showing various problems of searching application documents and databases.
Figure 2:
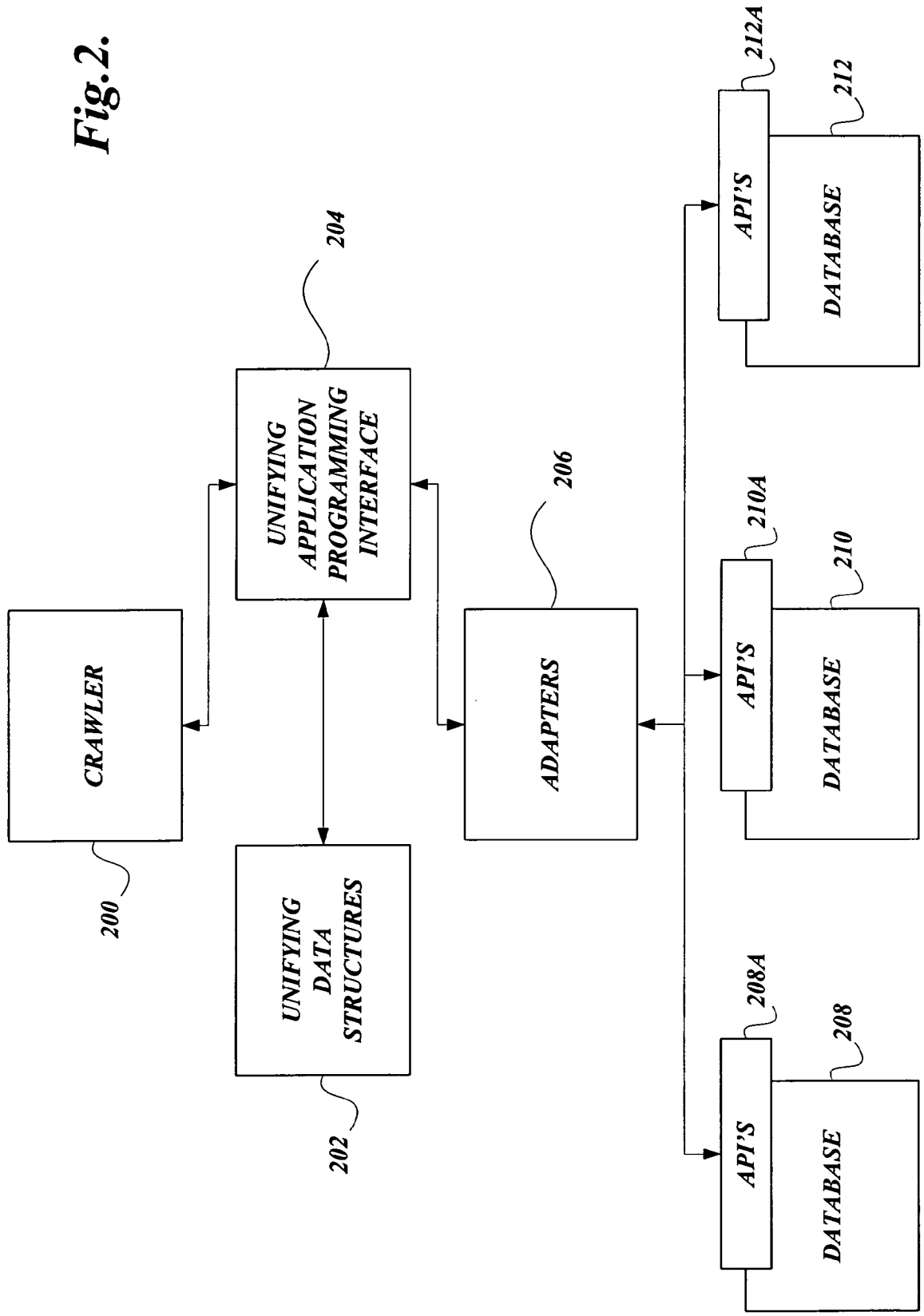
FIG. 2 is a block diagram illustrating an exemplary system for crawling databases and application documents for pieces of information.

A system in which business systems connected to an intranet can be searched is illustrated in FIG. 2. The system is a networked computing environment that has pieces of software applications collaborating to allow a crawler 200 to find pieces of information stored in business systems, which are formed from databases 208-212, and application documents (not shown). The crawler 200 is an automated application that searches an intranet for desired pieces of information. The crawler 200 indexes key fields in databases 208-212 and content-related information in such a way as to allow an examination for matches by a search engine (not shown).

The system illustrated in FIG. 2 provides a facility that enables the search engine to search for pieces of information, in databases 208-212, without the need to know the specific protocols to communicate with databases 208-212 and application documents, such as Microsoft Excel documents. Despite the multitude of possible protocols which the crawler 200 would have to use to connect to databases 208-212, various embodiments of the present invention include a unifying application programming interface 204 to unify the way to access pieces of information in databases 208-212 and application documents. The unifying application programming interface 204 provides a translation to allow the crawler 200 to communicate with databases 208-212 without knowing the specific protocols to communicate with databases 208-212 and application documents. Many databases, such as databases 208-212, understand structured query language, which is a conventional database sublanguage used in querying, updating, and managing databases. However, databases 208-212 typically have business logic that may obscure the use of structured query language to obtain desired pieces of information from databases 208-212. Therefore, each database 208-212 has a customizable protocol, which is specific to a particular database, to query the particular database for pieces of information. Many software applications stored application documents in embedded databases that are not accessible or visible to the crawler 200. These embedded databases in software applications are accessible if proper protocols are complied with. Various embodiments of the present invention allow a user to enter a keyword into a search engine, and through the crawler 200 desired pieces of information in databases 208-212 can be found and indexed in a way that these pieces of information can be returned as a search result to users.

The unifying application programming interface 204, together with the unifying data structures 202, allow the crawler 200 to communicate with databases 208-212 without knowing specific protocols to communicate with databases 208-212 and application documents. Even if the protocols of databases 208-212 were known specific application programming interfaces 208A-212A of databases 208-212 also have to be known in order to obtain desired pieces of information within databases 208-212. The unifying application programming interface 204 together with the unifying data structures 202 liberate the crawler 200 from knowing the specific protocols as well as the specific application programming interfaces 208A-212A to obtain desired pieces of information.

As will be appreciated by one skilled in the art, pieces of information stored in databases 208-212 can be quite large, ranging in the terabytes. Even though databases 208-212 can process various pieces of information at tremendous speed, various pieces of information get very large very quickly. It is preferred that the crawler 200 be constrained in regard to how much it will explore to index pieces of information in databases 208-212. Legacy data or historical data that are not of interest should preferably be avoided by the exploration of the crawler 200. Various embodiments of the present invention include filters or annotations in the unifying data structures 202 and these filters or annotations provide various constraints on the exploration of the crawler 200. When the crawler 200 invokes the unifying application programming interface 204, the unifying application programming interface 204 consults with the unifying data structures 202 to understand the constraints by which to explore pieces of information in the database 208-212 and application documents. One suitable technique to provide the filters or annotations is the use of data description language, which is a language designed specifically for describing data structures.

Suppose the database 208 has an API 208A, which can be invoked to get pieces of information regarding customers of a particular business. If the API is invoked, the database 208 returns a list of customers that can be searched through. Various embodiments of the present invention filter or annotate input parameters to the invocation of that API with constraints, such as the last modified date, to limit the exploration of the database 208. The crawler 200 can use the constraints stored in the unifying data structures 202 to find pieces of information that are newer than the last modified date. The API 208A returns pieces of information that correspond to the constraint (last modified date) provided by the unifying data structures 202. The constraints among other things stored by the unifying data structures 202 provide meaning to the API 208A in this example. In other words, the returned pieces of information are known to be customer information that are newer than the last modified date. The use of filters or annotations allows the crawler 200 to explore more efficiently.

After the database 208 is explored by the crawler 200, pieces of information come back by field names and field values. Each field has a certain meaning. A field may be a uniquely identifying field that identifies a particular row if the database 208 were implemented as a relational database. Various embodiments of the present invention can create hyperlinks from these uniquely identifying fields, so as to present category results to users, allowing connections to be made to the values associated with the pieces of information. When a user selects a hyperlink, all pieces of information connected with that particular hyperlink are displayed to the user via an appropriate application, such as a browser. Preferably, this technique is used to avoid overloading databases 208-212 by requiring databases 208-212 to return everything that the crawler 200 has explored. The filters or annotations in the unifying data structures 202, as well as the use of the key fields as identifiers, prevent the return of all pieces of information at once, so as to avoid destroying a computing system formed by the databases 208-212. Various embodiments of the present invention use the filters or annotations in the unifying data structures 202 and the key fields as identifiers to break up search requests in multiple pieces. When a user selects a hyperlink connected with a particular identifier, which in turn is connected with fields that uniquely identify a row in the database 208, a portion of the pieces of information, indicated as of interest by the user, is returned.

Databases 208-212 are composed of records, each containing fields together with a set of operations for searching, sorting, recombining, and other functions. A field in a record is a structure that uniquely identifies pieces of information designated to be part of a key. These keys aid in the performance of retrieval of pieces of information in databases 208-212. Various embodiments of the present invention provide a description or a name associated with these key fields. When a user selects one of these key fields, an appropriate record containing pieces of desired information is returned to the user.

The unifying data structures 202 describe a directory of systems representing databases 208-212 that the crawler 200 can explore. In other words, the unifying data structures 202 enumerate line of business systems, such as databases 208-212 within an organization, so as to allow the crawler 200 to explore. The filters or annotations in the unifying data structures 202 provide meanings to the pieces of information in databases 208-212 that are found by the exploration of the crawler 200. Through the unifying application programming interface 204, the crawler 200 may communicate with any of the databases 208-212. The crawler 200 needs only to communicate with the unifying application programming interface 204. The unifying application programming interface 204 knows a particular adapter among adapters 206 to use to communicate with databases 208-212. A chosen adapter among adapters 206 in turn knows a particular API among APIs 208A-212A to access pieces of information in databases 208-212.

Adapters 206 are typically provided by software manufacturers of databases 208-212. However, third-party software manufacturers can also provide adapters 206. Although typically, the adapters 206 do not provide semantic transformation (or the imparting of meanings), the unifying application programming interface 204, together with the unifying data structures 202, provide semantic transformation because, as can be appreciated by one skilled in the art, the crawler 200 typically does not expect to understand the semantics of pieces of information stored in the databases 208-212. During exploration, the crawler 200 sees fields or tables or pieces of information without understanding what the pieces of information mean. The semantic transformation provided by the unifying application programming interface 204 and the unifying data structures 202, such as "last modified date," enable the crawler 200 to search more intelligently.

Figure 3:
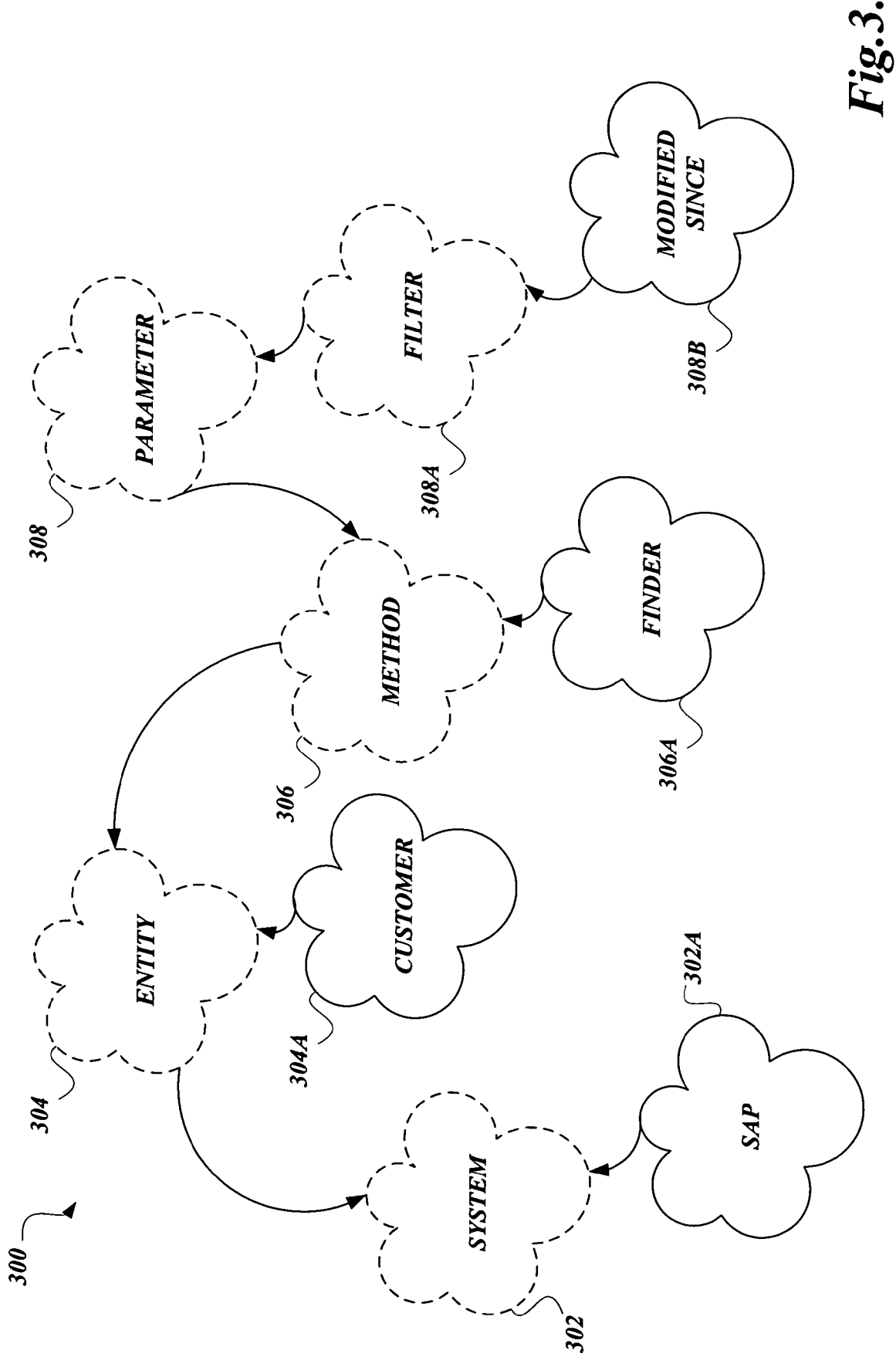
FIG. 3 is a cloud diagram illustrating generalized categories that describe groups of items that together define structures over pieces of information stored in databases and application documents.
Figure 4A:
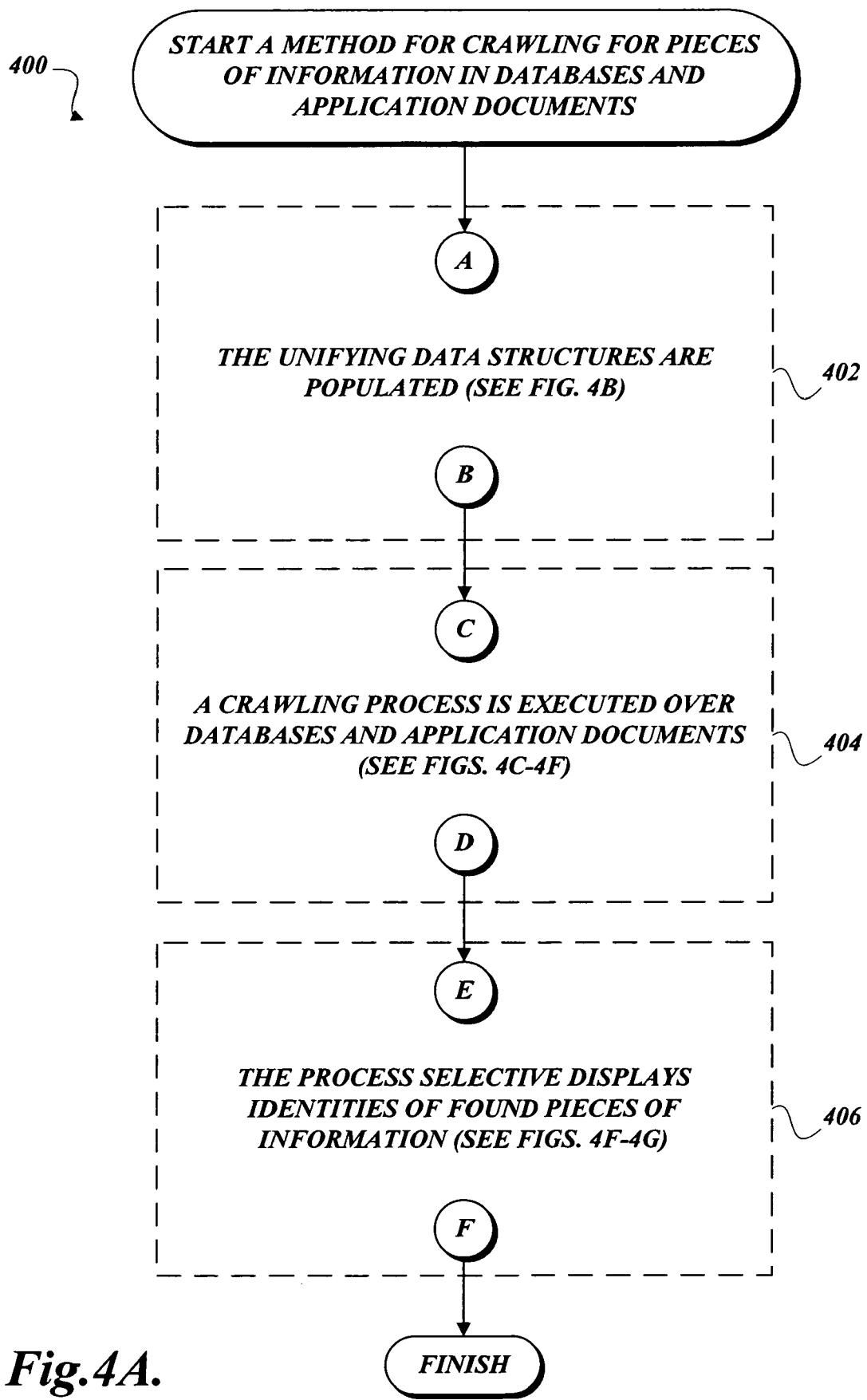
FIGS. 4A-4G are process diagrams illustrating a process for crawling for information in databases and application documents, according to one embodiment of the present invention.
Figure 4B:
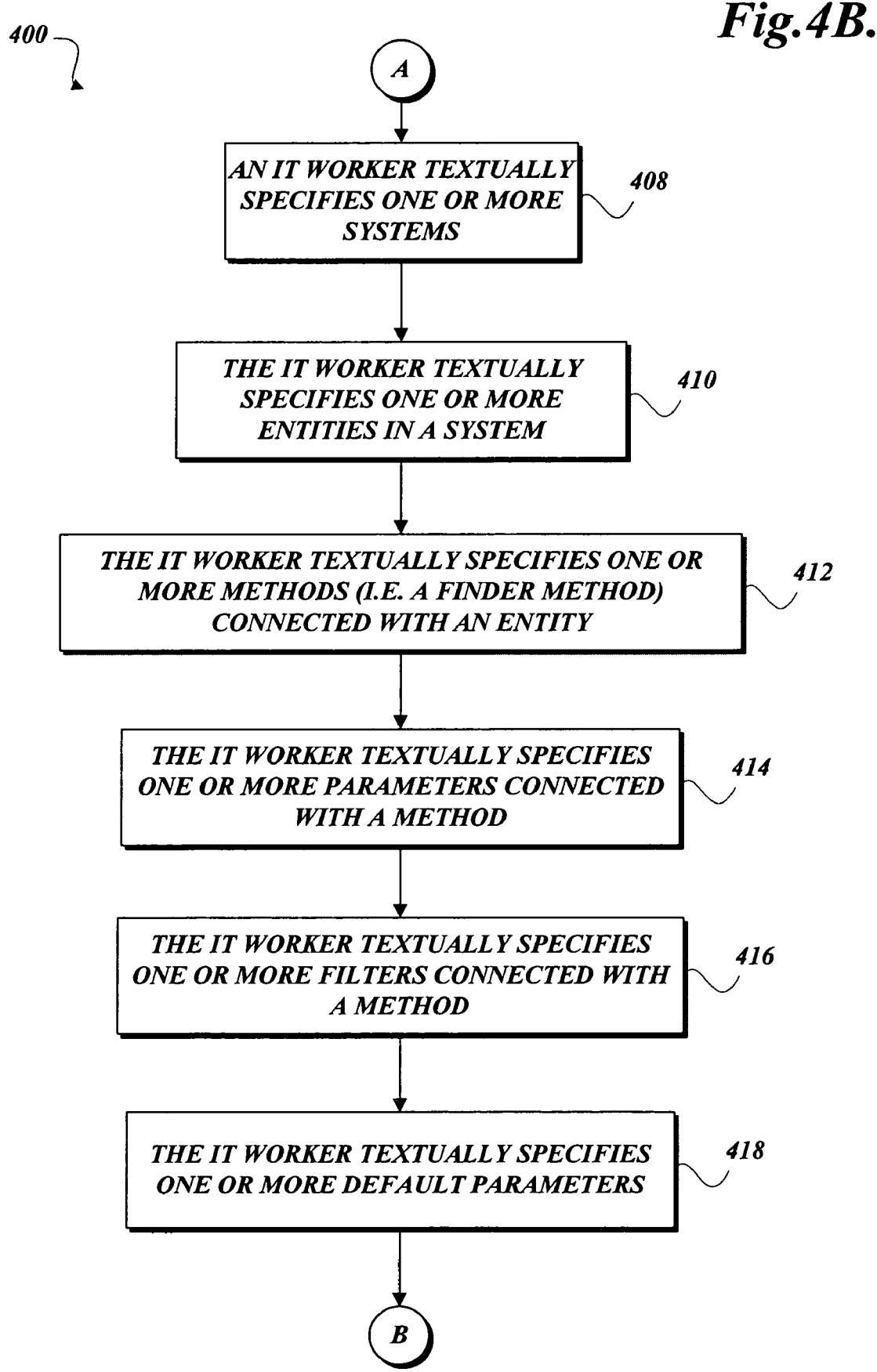
Figure 4C:
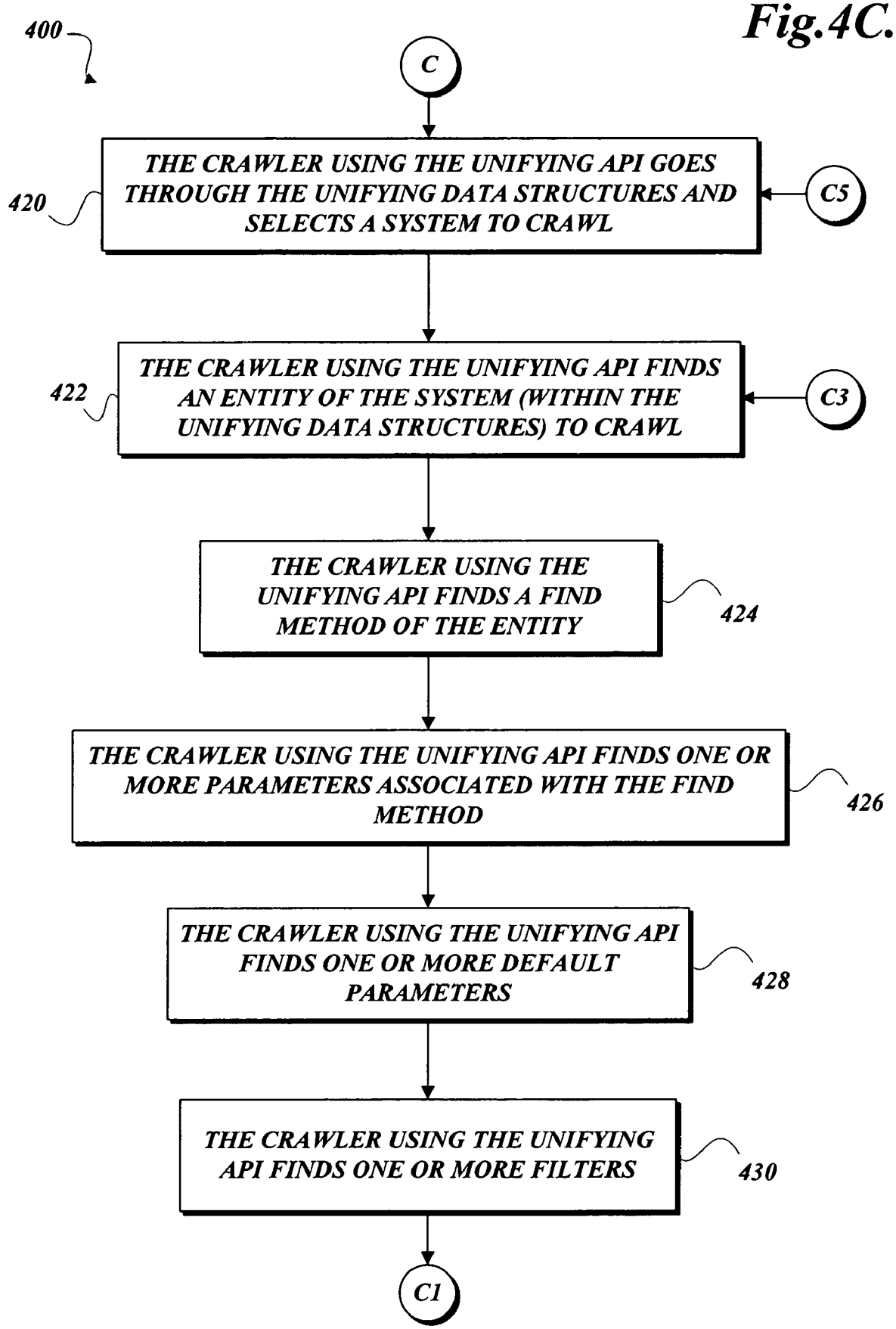
Figure 4D:
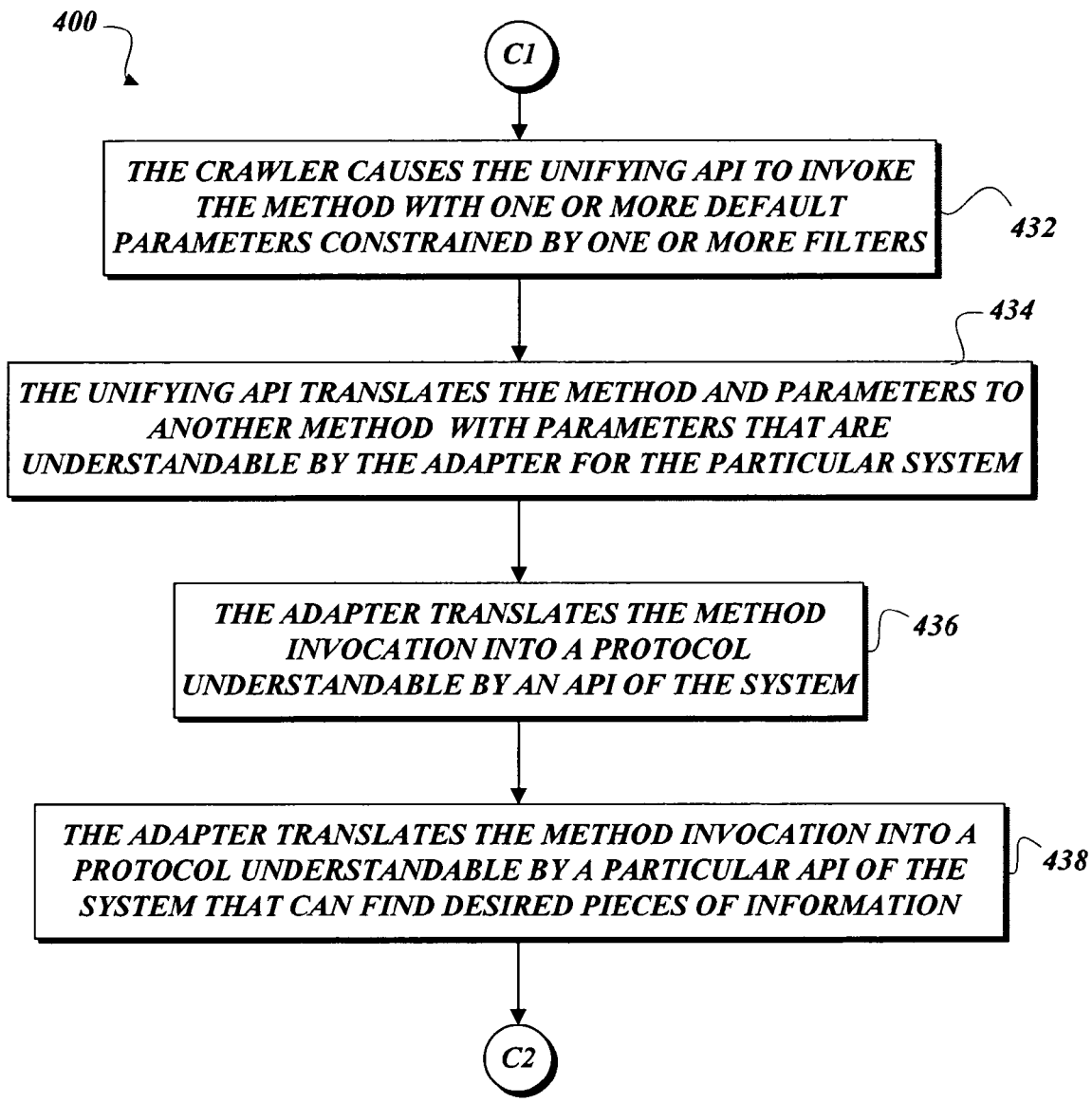
Figure 4E:
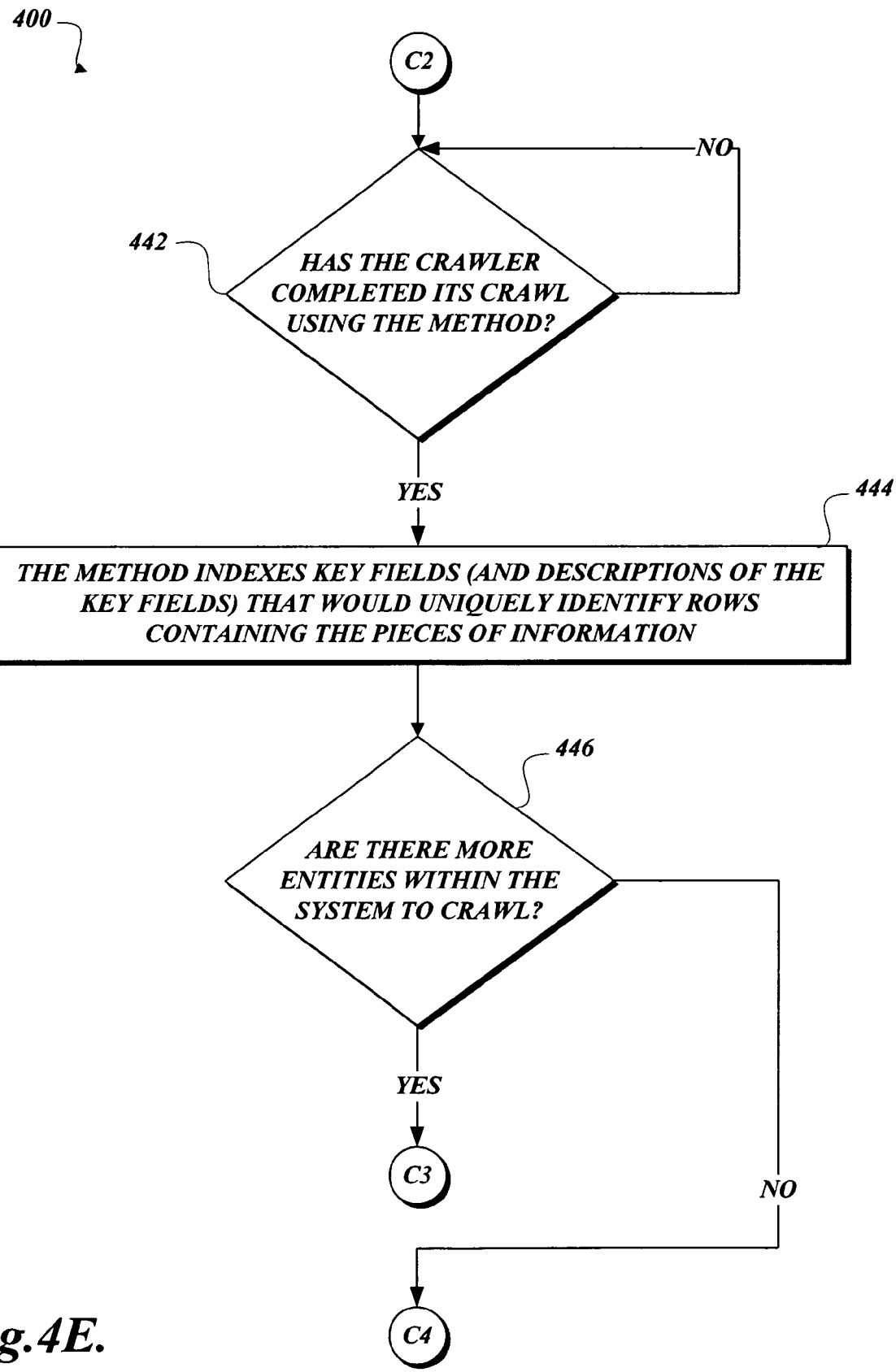
Figure 4F:
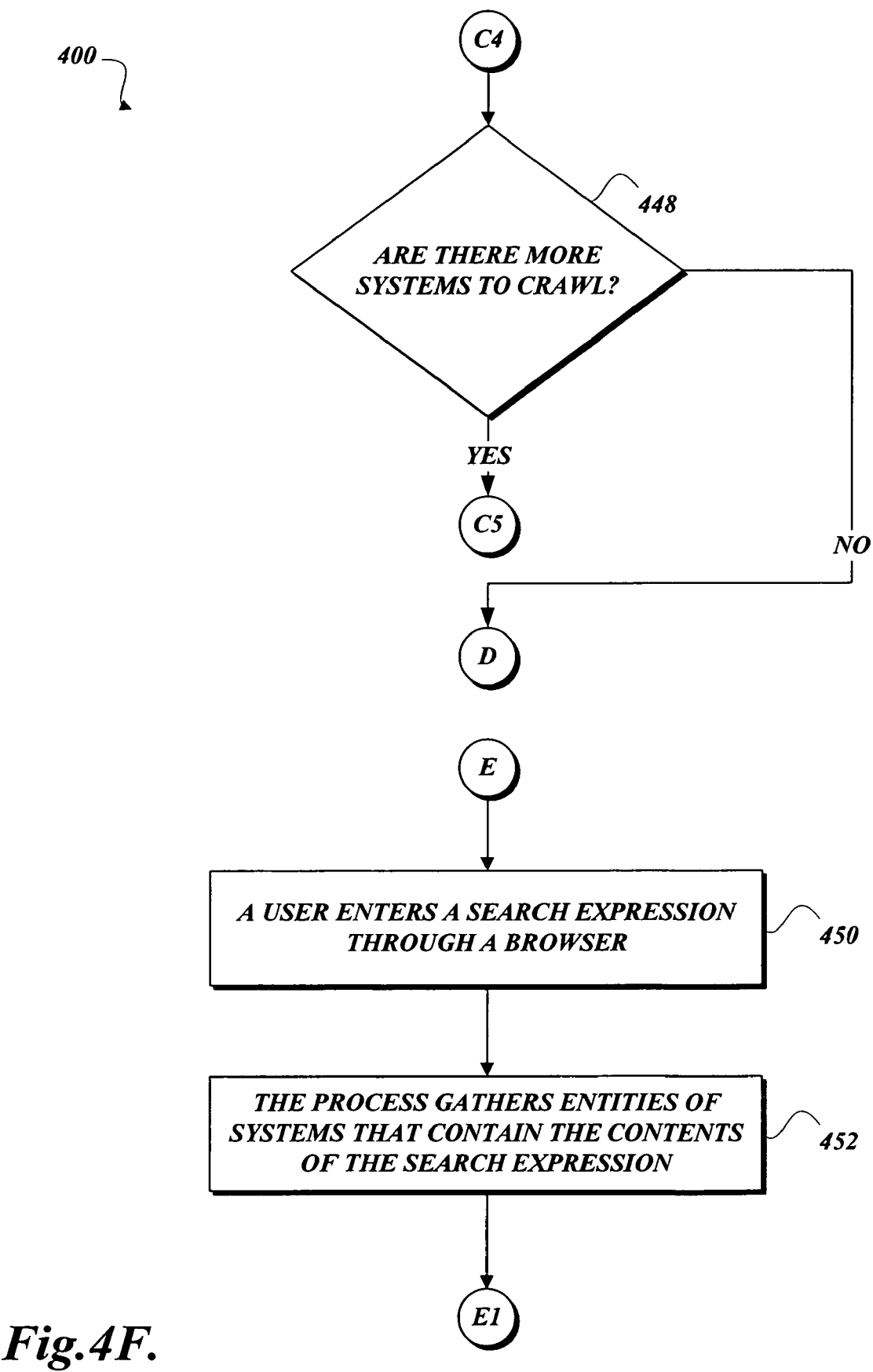
Figure 4G:
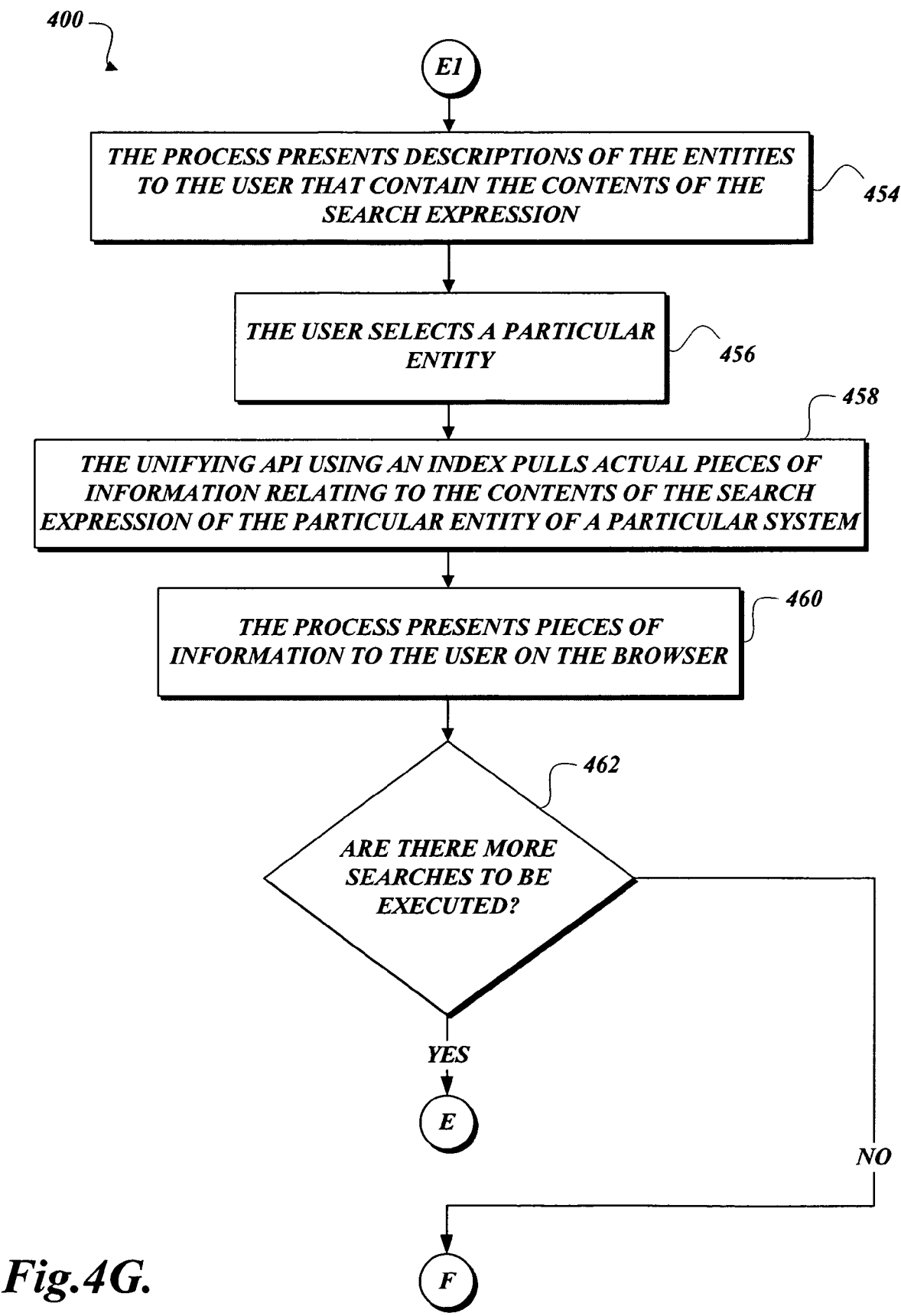

FIG. 3 illustrates a cloud diagram 300 that better defines the unifying data structures 202. A system 300 illustrates a relationship among clouds, each cloud being a generalized category that describes a group of more specific items. See FIG. 3. A cloud is a descriptive tool used in a program to define a set of attributes and/or a set of services (actions available to other parts of the program) that characterize any member of a cloud. Essentially, each cloud defines the type of entities it includes and the ways those entities behave. Each cloud can be implemented using a suitable programming technique, such as object-oriented programs or relational database tables.

A system cloud 302 defines attributes and services representing a line of business that contains pieces of information connected with that business. For example, databases 208-212 are each a system representable by the system class 302. An instance of the system 302 includes a SAP system 302A, which defines attributes and services connected with the SAP system. An edge emanating from the SAP system 302A and terminating in an arrow-shaped figure at the system cloud 302 indicates that there is a correspondence between an instantiation of the SAP system 302A and the system cloud 302.

An entity cloud 304 defines attributes and services connected with a structure that is imposed over pieces of information in a system, such as databases 208-212 or the SAP system 302A. For example, suppose the SAP system 302A is implemented using a relational database. Using an appropriate instantiation of the entity cloud 304, the crawler 200 does not see a relational table of data, but rows of customers in the SAP system 302A. An edge emanating from the entity cloud 304 and terminating in an arrow-shaped figure at the system cloud 302 indicates a one-to-many relationship (in other words, one system and many entities within the one system) with the system cloud 302.

A customer instance 304A defines attributes and services connected with a representation of a customer that purchases a commodity or service. The customer instance 304A can be used to impose meanings and structure over pieces of information in the SAP system 302A to indicate that certain pieces of information contained in them are information pertaining to customers. Each entity as represented by the entity cloud 304 is a description of structures over pieces of information that exist in systems represented by the system cloud 302, such as the SAP system 302A. An edge emanating from the customer entity 304A and terminating in an arrow-shaped figure at the entity cloud 302 indicates that there is a correspondence between an instantiation of the customer entity 304A and the entity cloud 302.

Each entity cloud 304 has characteristics that are represented by a method cloud 306. The method cloud 306 defines attributes and services representing behaviors that an entity may have. An edge emanating from the method cloud 306 and terminating in an arrow-shaped figure at the entity cloud 304 indicates a one-to-many relationship (in other words, one entity and many methods within the one entity) with the entity cloud 304.

A finder method 306A provides the ability to find entities within a system. For example, the finder method 306A may be used to find customers as entities in a system, such as the SAP system 302A. Preferably, the crawler 200 uses a particular finder method of an entity in the system to find all instances of the entity. An edge emanating from the finder method 306A and terminating in an arrow-shaped figure at the method cloud 306 indicates that there is a correspondence between an instantiation of the finder method 306A and the method cloud 306.

Each method has one or more parameters. These parameters are represented by a parameter cloud 308, which defines attributes and services representing a parameter for a method. An edge emanating from the parameter cloud 308 and terminating in an arrow-shaped figure at the method cloud 304 indicates a one-to-many relationship (in other words, one method and many parameters within the one method) with the method cloud 306.

One type of parameter is a filter, represented by a filter cloud 308A. The filter cloud 308A defines attributes and services that annotate or limit pieces of information explored and returned by the crawler 200 via the invocation of a method, such as the finder method 306A. An edge emanating from the filter cloud 308A and terminating in an arrow-shaped figure at the parameter cloud 308 indicates a one-to-many relationship (in other words, one parameter and many filters within the one parameters) with the parameter cloud 308.

One preferred filter is represented by the "modified-since" filter 308B, which defines attributes and services connecting with limiting pieces of information that have a date of modification beyond a particular point. An edge emanating from the modified-since filter 308A and terminating in an arrow-shaped figure at the filter cloud 308A indicates that there is a correspondence between an instantiation of the modified-since filter 308B and the filter cloud 308A. The filter cloud 308A can be instantiated to annotate or filter for desired pieces of information from a system, such as the SAP system 302A.

Preferably, the name of the method, such as the finder method 306A and its signature, such as instances of the parameter cloud 308 and instances of the filter 308A (i.e., the modified-since filter 308B) are textually described and stored in the unifying data structures 202. The method cloud 306 is a collection of parameters represented by the parameter cloud 308. A collection of methods represented by the method clouds 306 are characteristics or behaviors of an entity represented by the entity cloud 304. Together, instances of the system cloud 302, instances of the entity cloud 304, and instances of the method cloud 306 point to a piece of logic stored in a system, such as API 308A-212A of databases 208-212, which can be invoked to obtain desired pieces of information.

Suppose a user enters a search expression "98229" into a search entry area of a browser. The search string could mean a number of things, such as an order number, a customer number, a zip code, and so on. Neither the search engine nor the crawler 202 would know what is meant by the search expression. The entity class 304 provides semantics in the unifying data structures 202 so as to allow the return data to make sense. For example, the crawler 200 may return the categories of entities in the SAP system 302A where the search expression "98229" can be found. These categories include order number, customer, zip code, and so on. The search expression could appear in any fields stored in the SAP system 302A or other systems, such as databases 208-212. To get the pieces of information out of a system, the user needs to indicate by selecting a hyperlink representing a particular entity. From this election, the crawler 200 would know the specific method or finder method to invoke so as to extract the desired pieces of information from the SAP system 302A.

Various embodiments of the present invention supplant the need to write a new protocol handler that interacts directly with a protocol specific to a particular system, such as databases 208-210. Instead, using the unifying application programming interface 204 and the unifying data structures 202, the crawler 200 needs to interact directly with the unifying application programming interface 204 without knowing the specific details of protocols required by databases 208-212. The specific protocols connected with databases 208-212 are in a sense transformed to a single unifying protocol by various embodiments of the present invention. More specifically, the transformation is the invocation of a finder method for a particular entity by the crawler 200. To find information, the crawler 200 needs only to find a desired finder method of a particular entity of interest to a user. No other complicated protocol needs to be known by the crawler 200 to extract desired pieces of information from databases 208-212.

The unifying data structures 202, textually contain various systems defined by the system cloud 302, various entities defined by the entity cloud 304, various methods (such as the finder method 306A) defined by the method cloud 306, various parameters defined by the parameter cloud 308, and various filters (such as the modified-since filter 308B) defined by the filter cloud 308A. It is preferred that an information technology (IT) worker within an organization with knowledge of systems, such as databases 208-212, populate the unifying data structures 202. There is no need for writing code using various embodiments of the present invention in the implementation of the unifying data structures 202. It is preferred that a user interface be provided to the information technology worker in the organization to populate the unifying data structures 202.

There can be more than one finder method 306A. Preferably, one finder method allows the finding of a specific row containing pieces of information within a system, such as databases 208-212. Another suitable finder is one that finds multiple rows containing desired pieces of information. Some methods represented by the method cloud 306, may have complex parameters represented by the parameter class 308. To simplify the invocation of the method, various embodiments of the present invention allow default parameters for various methods to be described and stored in the unifying data structures 202. These default parameters will be automatically inserted in the invocation of the method without the need for the crawler 202 to specify the minutiae of the parameters.

FIGS. 4A-4G illustrate a process 400 for crawling for pieces of information in databases and application documents, and for clarity purposes, the following description of the process 400 makes references to various elements illustrated in connection with the cloud diagram 300 (FIG. 3) and the crawler 200 (FIG. 2). From a start block, the process 400 proceeds to a set of process steps 402, defined between a continuation terminal ("Terminal A") and an exit terminal ("Terminal B"). The set of process steps 402 describes the process by which the unifying data structures 202 are populated.

From Terminal A (FIG. 4B), the process 400 proceeds to block 408 where an information technology worker textually specifies one or more systems. The process 400 proceeds to block 410 where the IT worker textually specifies one or more entities in a system. The IT worker then textually specifies one or more methods (i.e., a finder method) connected with an entity. See block 412. The process 400 then flows to block 414 where the IT worker textually specifies one or more parameters connected with a method. Next, at block 416, the IT worker textually specifies one or more filters connected with a method. The IT worker also textually specifies one or more default parameters. See block 418. The method then continues to the exit Terminal B.

From the exit Terminal B, the process 400 proceeds to a set of process steps 404, defined between a continuation terminal ("Terminal C") and an exit terminal ("Terminal D"). The set of process steps 404 describes a crawling process that is executed over databases and application documents.

From Terminal C (FIG. 4C), the process 400 proceeds to block 420 where the crawler using the unifying API goes through the unifying data structures and selects a system to crawl. Next, at block 422, the crawler using the unifying API finds an entity of the system (within the unifying data structures) to crawl. One example of a system is the database 208. Another example of an entity is the customer entity 304A. The crawler using the unifying API finds a find method of the entity. See block 424. The process 400 then proceeds to block 426 where the crawler, using the unifying API, finds one or more parameters associated with the find method. The crawler, using the unifying API, finds one or more default parameters. See block 428. The process 400 then continues to block 430 where the crawler, using the unifying API, finds one or more filters so as to constrain the expiration of the crawler. Next, the process 400 continues to another continuation terminal ("Terminal C1").

From Terminal C1 (FIG. 4D), the crawler causes the unifying API to invoke the method with one or more default parameters constrained by one or more filters. Next, at block 434, the unifying API translates the method and parameters to another method with parameters that are understandable by the adapter for the particular system, such as the database 208. The adapter translates the method invocation into a protocol understandable by an API other system, such as the API 208A. See block 436. The process 400 then continues to block 438 where the adapter translates the method invocation into a protocol understandable by a particular API of the system that can find desired pieces of information. The process 400 then continues to another continuation terminal ("Terminal C2").

From Terminal C2 (FIG. 4E), the process 400 proceeds to decision block 442 where a test is performed to determine whether the crawler has completed its crawl using the chosen method. If the answer is NO to the test at decision block 442, the process 400 loops back to execute a test at decision block 442 again. Otherwise, if the answer is YES, the process 400 continues to block 444 where the method indexes key fields (and descriptions of the key fields) that would uniquely identify rows containing the desired pieces of information. Another test is performed at decision block 446 to determine whether there are more entities within the system to crawl. If the answer to the test at decision block 446 is YES, the process 400 proceeds to another continuation terminal ("Terminal C3"). From Terminal C3 (FIG. 4C), the process 400 loops back to block 422 where the above-identified processing steps are repeated. Otherwise the answer to the test at decision block 446 is NO, and the process 400 proceeds to another continuation terminal ("Terminal C4").

From Terminal C4 (FIG. 4F), the process 400 proceeds to decision block 448 where a test is performed to determine whether there are more systems to crawl. If the answer to the test is YES, the method continues to another continuation terminal ("Terminal C5"). From Terminal C5 (FIG. 4C) the process loops back to block 420 where the above-identified processing steps are repeated. Otherwise, the answer to the test at decision block 448 is NO, and the process 400 proceeds to the exit Terminal D.

From exit Terminal D, the process 400 proceeds to a set of processing steps 406, defined between a continuation terminal ("Terminal E") and an exit terminal ("Terminal F"). The set of processing steps 406 selectively displays various identities of pieces of information found by the crawler. From Terminal E (FIG. 4F), a user enters a search expression through a browser. See block 450. Next, at block 452, the process 400 gathers entities of systems that contain the contents of the search expression. The process 400 then continues to another continuation terminal ("Terminal E1").

From Terminal E1 (FIG. 4G), the process 400 proceeds to block 454 where the process presents descriptions of the entities to the user that contain the contents of the search expression. Next, at block 456, the user selects a particular entity. The unifying API using an index pulls actual pieces of information relating to the contents of the search expression and the particular entity of a particular system. The process 400 then proceeds to block 460 where the process presents pieces of information to the user on the browser. The process 400 then continues to decision block 462 where another test is performed to determine whether there are more searches to be executed. If the answer to the test at decision block 462 is YES, the process 400 continues to Terminal E and loops back to FIG. 4F where the above-described processing steps are repeated. Otherwise, the answer to the test at decision block 462 is NO, and the process 400 continues to the exit Terminal F and terminates execution.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for exploring diverse databases for information, the system comprising:
   at least one memory storage comprising:
      unifying data structures configured to enumerate a set of databases to be explored and filters configured to constrain pieces of information to be returned and to break up search requests in multiple pieces and prevent overloading of the set of databases,
      a unifying application programming interface that semantically transforms protocols configured to communicate with the set of databases into one protocol using the filters to impart meaning to the pieces of information, and
      a crawler using the one protocol in the unifying application programming interface to invoke a method described in the unifying data structures to explore the pieces of information in the set of databases without knowing a corresponding protocol as well as a corresponding application programming interface specific to each database in the set of databases, the crawler being configured to avoid legacy data that is not of interest, the filters being configured to constrain the crawler, the unifying application programming interface being configured to interact with the unifying data structures to determine constraints of the crawler, wherein the unifying application programming interface being configured to interact with the unifying data structures to determine the constraints of the crawler comprises the unifying application programming interface being configured to consult with the unifying data structures to understand the constraints by which to explore the pieces of information in the set of databases and to provide a translation to allow the crawler to invoke the method associated with crawling the set of databases, wherein consulting, by the unifying application programming interface, comprises using data description language designed specifically for describing the unified data structures; and at least one processing unit coupled to the at least one memory storage.

2. The system of claim 1, wherein the unifying data structures include at least one entity, which define attributes and services connected with a structure that is imposed on the pieces of information in a system, each system including a database from the set of databases, each entity imposing a structure on the pieces of information in at least one database in the set of databases.

3. The system of claim 2, wherein the unifying data structures include at least one method under the at least one entity, which define attributes and services representing behaviors belonging to the at least one entity, each of the at least one method being described by the unifying data structures that are configured to provide the crawler a facility to invoke and explore for the pieces of information in the at least one database.

4. The system of claim 3, wherein the unifying data structures include at least one parameter, which define attributes and services representing parameters of the at least one method, the at least one parameter being annotated by the filters to constrain the pieces of information to be returned.

5. The system of claim 4, wherein the filters include a date modification filter that filters for the pieces of information that were modified from a particular date.

6. A computer-implemented method to explore databases and application documents for pieces of information, the method comprising:
crawling, by a computing device in communication with a crawler, for the pieces of information by,
avoiding at least one of the following: access legacy data and historical data that is not of interest, and
accessing unifying data structures to explore each entity under each database by invoking a finder method with at least one filter without knowing a protocol and an application programming interface specific to each database, the at least one filter being configured for:
constraining the pieces of information to be returned, breaking up search requests into multiple pieces,
preventing an overloading of at least one database, the at least one database comprising at least one record, the at least one record comprising at least one field, the at least one field identifying information that is part of a key, and
constraining the crawler, wherein constraining the crawler comprises a unifying application programming interface semantically transforms protocols configured to communicate with the set of databases into one protocol using the at least one filter to impart meaning to the pieces of information and the unifying application programming interface interacting with the unifying data structures to determine constraints of the crawler by consulting with the unifying data structures to understand the constraints by which to explore the pieces of information in the at least one database and to provide a translation to allow the crawler to invoke the finder method associated with crawling the at least one database, wherein consulting with the unifying data structures comprises using data description language designed specifically for describing the unified data structures; and
receiving a user selection when a user selects a hyperlink, the hyperlink being associated with an identifier to obtain the pieces of information in the at least one database pertaining to an entity associated with the identifier.

7. The method of claim 6, further comprising populating the unifying data structures prior to crawling to enumerate the at least one database to be crawled, the entities, configured to define attributes and services connected with a structure that is imposed on the pieces of information in each database, the method which defines attributes and services representing parameters of each method, and the filters associated with the parameters.

8. The method of claim 7, further comprising indexing key fields in each database.

9. The method of claim 8, further comprising translating the invocation of the method by the unifying application programming interface into an invocation of an application programming interface particular to each database.

10. The method of claim 9, further comprising filtering pieces of information found in the at least one database to comply with the filters associated with the invocation of the method.

11. A computer-readable storage medium having instructions stored thereon for implementing a computer-implemented method that is configured to explore databases and application documents for desired pieces of information, the method comprising:
crawling, by a crawler, for the pieces of information by,
avoiding at least on of the following: legacy data and historical data that is not of interest, and
accessing unifying data structures to explore each entity under each database by invoking a finder method with at least one filter without knowing a protocol and an application programming interface specific to each database, each filter being configured for:
constraining the pieces of information to be returned, breaking up search requests into multiple pieces,
preventing an overloading of at least one database, the at least one database comprising at least one record, the at least one record comprising at least one field, the at least one field identifying information that is part of a key, and
constraining the crawler, wherein constraining the crawler comprises a unifying application programming interface semantically transforms protocols configured to communicate with the databases into one protocol using the at least one filter to impart meaning to the pieces of information and the unifying application programming interface interacting with the unifying data structures to determine constraints of the crawler by consulting with the unifying data structures to understand the constraints used to explore the pieces of information in the at least one database and to provide a translation to allow the crawler to invoke the finder method associated with crawling the at least one database, wherein consulting with the unifying data structures comprises using data description language designed specifically for describing the unified data structures; and
receiving a user selection when a user selects a hyperlink, wherein the hyperlink is associated with an identifier to obtain the pieces of information in the at least one database pertaining to an entity associated with the identifier.

12. The computer-readable storage medium of claim 11, further comprising populating the unifying data structures prior to crawling to enumerate the one or more databases to be crawled, the entities, which define attributes and services connected with a structure that is imposed on the pieces of information in each database, the method which defines attributes and services representing behaviors belonging to each entity, parameters which define attributes and services representing parameters of each method, and the filters associated with the parameters.

13. The computer-readable storage medium of claim 12, further comprising indexing key fields in each database.

14. The computer-readable storage medium of claim 13, further comprising translating the invocation of the method by a unifying application programming interface into an invocation of an application programming interface particular to each database.

15. The computer-readable storage medium of claim 14, further comprising filtering the pieces of information found in the databases to comply with the filters associated with the invocation of the method.

* * * * *